United States Patent
Fujimaki et al.

(10) Patent No.: US 10,003,203 B2
(45) Date of Patent: Jun. 19, 2018

(54) ALL-SOLID-STATE SECONDARY BATTERY SYSTEM

(71) Applicant: TOYOTA JIDOSHA KABUSHIKI KAISHA, Toyota-shi, Aichi-ken (JP)

(72) Inventors: Hisataka Fujimaki, Nisshin (JP); Koichi Sugiura, Susono (JP); Yuki Matsushita, Atsugi (JP); Satoshi Yoshida, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 15/339,429

(22) Filed: Oct. 31, 2016

(65) Prior Publication Data
US 2017/0155256 A1 Jun. 1, 2017

(30) Foreign Application Priority Data
Nov. 27, 2015 (JP) .................. 2015-231654

(51) Int. Cl.
*H02J 7/00* (2006.01)
*H01M 10/0585* (2010.01)
(Continued)

(52) U.S. Cl.
CPC ......... *H02J 7/0026* (2013.01); *H01M 10/052* (2013.01); *H01M 10/0562* (2013.01); *H01M 10/0585* (2013.01); *H01M 10/425* (2013.01); *H01M 10/4235* (2013.01); *H01M 10/46* (2013.01); *H01M 10/48* (2013.01);
(Continued)

(58) Field of Classification Search
CPC .. H02J 7/0026; H02J 7/048; H02J 2007/0037; H01M 10/052; H01M 10/0562; H01M 10/0585; H01M 10/4235; H01M 10/425; H01M 10/46; H01M 10/48;
(Continued)

(56) References Cited

U.S. PATENT DOCUMENTS 3,656,340 A * 4/1972 Ball .................. G01B 7/18
429/90
6,664,000 B1 12/2003 Sonobe
(Continued)

FOREIGN PATENT DOCUMENTS

JP 2001-345123 A 12/2001
JP 2002-313431 A 10/2002
(Continued)

*Primary Examiner* — Nathaniel Pelton
(74) *Attorney, Agent, or Firm* — Oliff PLC

(57) ABSTRACT

An all-solid-state secondary battery system comprising: a sealed battery having formed by housing, in an outer package, a stacked battery; a jig adapted to constrain the sealed battery in the stacking direction; one or more contact pressure sensors provided at least either between an outermost layer surface of the stacked battery and the outer package or in the inside of the stacked battery; one or more gas pressure sensors provided in a space inside the outer package; and a control device adapted to stop charging by judging as an overcharge state only when the change in contact pressure sensed by at least one of the contact pressure sensors is equal to or more than a threshold value, and the change in gas pressure sensed by at least one of the gas pressure sensors is equal to or more than the threshold value.

6 Claims, 9 Drawing Sheets

(51) Int. Cl.
*H01M 10/42* (2006.01)
*H01M 10/46* (2006.01)
*H01M 10/48* (2006.01)
*H01M 10/052* (2010.01)
*H01M 10/0562* (2010.01)
*H02J 7/04* (2006.01)

(52) U.S. Cl.
CPC ..... *H02J 7/048* (2013.01); *H01M 2010/4271* (2013.01); *H01M 2200/20* (2013.01); *H01M 2220/20* (2013.01); *H01M 2300/0068* (2013.01); *H02J 2007/0037* (2013.01)

(58) Field of Classification Search
CPC ..... H01M 2010/4271; H01M 2200/20; H01M 2220/20
USPC .......................................................... 320/162
See application file for complete search history.

(56) References Cited

U.S. PATENT DOCUMENTS

| 2001/0038940 | A1  | 11/2001 | Okumura et al. |              |
|--------------|-----|---------|----------------|--------------|
| 2013/0033102 | A1* | 2/2013  | Goff           | H02J 7/0014  |
|              |     |         |                | 307/10.6     |
| 2013/0260192 | A1* | 10/2013 | LePort         | H01M 10/42   |
|              |     |         |                | 429/62       |

FOREIGN PATENT DOCUMENTS

| JP | 3638102 B2    | 4/2005  |
| JP | 2006-269345 A | 10/2006 |
| JP | 4529516 B2    | 8/2010  |

* cited by examiner

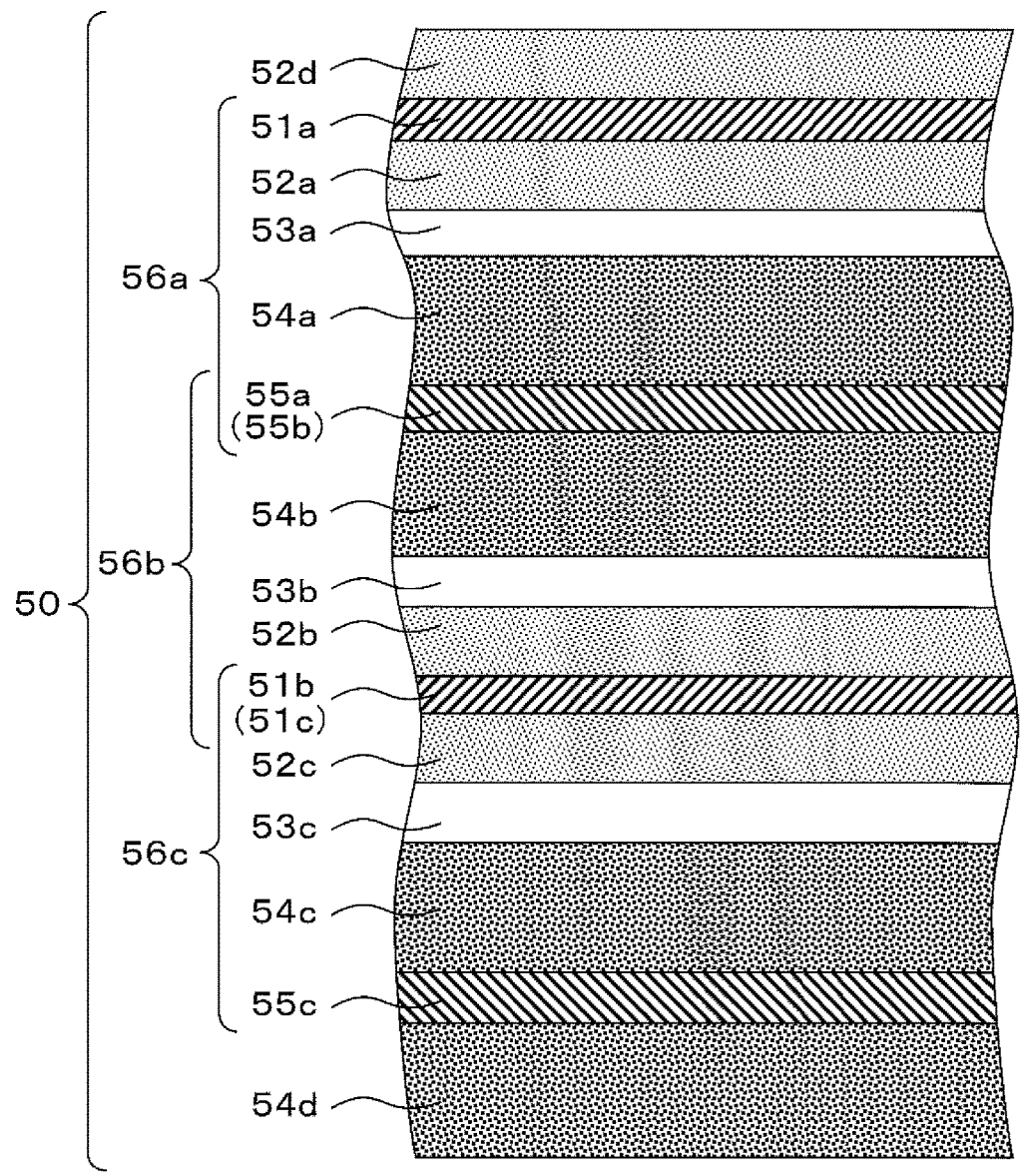

ALL-SOLID-STATE SECONDARY BATTERY SYSTEM

TECHNICAL FIELD

The present invention relates to an all-solid-state secondary battery system. More specifically, the present invention relates to an all-solid-state secondary battery system prevented from overcharge.

BACKGROUND ART

As a power source for driving a motor of a hybrid automobile, etc., a secondary battery such as a nickel hydrogen battery and lithium ion battery is currently being used.

At the time of charging of such a secondary battery, overcharge must be avoided so as to suppress, for example, heat generation of the secondary battery or deterioration of the performance. A secondary battery system usually has a function of avoiding overcharge.

For example, Patent Document 1 discloses a secondary battery system using a liquid electrolyte, such as nickel hydrogen battery. In the secondary battery system disclosed in Patent Document 1, when a gas pressure in a battery case increases, the battery is judged to be in an overcharge state, and the charging is stopped.

Patent Document 2 discloses a secondary battery system in which a laminate material obtained by laminating together a metal foil such as aluminum and a heat-welding resin layer via an adhesive layer is used for the outer package. In this outer package, a stacked battery having stacked therein an anode current collector layer, an anode active material layer, an electrolyte layer, a cathode active material layer, and a cathode current collector layer is housed to form a sealed battery. Then, sealed batteries are stacked in the thickness direction to form an assembled battery.

In the secondary battery system disclosed in Patent Document 2, when a contact pressure between adjacent sealed batteries or between a sealed battery and a member constraining the sealed battery in the thickness direction is elevated, the battery is judged to be in an overcharge state, and the charging is stopped. In Patent Document 2, it is disclosed that the outer package of the sealed battery is expanded by a gas produced upon decomposition of a liquid electrode and this results in a rise in the contact pressure between outer packages of adjacent sealed batteries or between an outer package of a sealed battery and a member constraining the sealed battery in the thickness direction.

Patent Document 3 discloses an all-solid-state secondary battery system using a stacked or wound battery in which an anode current collector layer, an anode active material layer, a solid electrolyte layer, a cathode active material layer and a cathode current collector layer are stacked or wound. The stacked battery is housed in an outer package to form a sealed battery. In the all-solid-state secondary battery system disclosed in Patent Document 3, a contact pressure sensor is provided inside the stacked battery and when the contact pressure sensed by the contact pressure sensor is elevated, the battery is judged to be in an overcharge state, followed by stopping of charging.

RELATED ART

Patent Document

[Patent Document 1] Japanese Unexamined Patent Publication No. 2001-345123

[Patent Document 2] Japanese Unexamined Patent Publication No. 2006-269345

[Patent Document 3] Japanese Unexamined Patent Publication No. 2002-313431

SUMMARY OF THE INVENTION

Problems to be Solved by the Invention

Both of the secondary battery systems disclosed in Patent Documents 1 and 2 use a liquid electrolyte. Accordingly, when the battery enters into an overcharge state, the liquid electrolyte is decomposed to produce a large amount of gas. In the secondary battery system of Patent Document 1, a rise in the gas pressure in the battery case is sensed by the production of a large amount of gas. On the other hand, in the secondary battery system of Patent Document 2, the outer package of the sealed battery is expanded due to the production of a large amount of gas, and a rise in the contact pressure between adjacent sealed batteries is thereby sensed.

The secondary battery system of Patent Document 1 and the secondary battery system of Patent Document 2 differ in the point that while a rise in the gas pressure is sensed in the former, a rise in the contact pressure is sensed in the latter. However, both of the secondary battery systems share a common feature of utilizing a phenomenon attributable to production of a large amount of gas resulting from decomposition of a liquid electrolyte due to overcharge.

On the other hand, in the all-solid-state secondary battery system disclosed in Patent Document 3, since a solid electrolyte is used, the amount of a gas produced resulting from decomposition of the solid electrolyte due to overcharge is very small. Consequently, even when the battery enters into an overcharge state, the gas pressure inside the outer package increases very little.

In addition, even when the battery enters into an overcharge state, a gas in an amount large enough to greatly expand the outer package is not produced. Accordingly, even when a contact pressure sensor is provided between adjacent outer packages as in the secondary battery system disclosed in Patent Document 2, it is difficult to detect the fact that the battery is in an overcharge state.

To cope with this problem, in the all-solid-state secondary battery system of Patent Document 3, a contact pressure sensor is provided between adjacent layers out of an anode current collector layer, an anode active material layer, a solid electrolyte layer, a cathode active material layer, and a cathode current collector layer, constituting the stacked battery, and when a rise in the contact pressure is sensed by the contact pressure sensor, the battery is judged to be in an overcharge state.

However, other than when the battery is in an overcharge state, the contact pressure increases also when a jig constraining the stacked battery is expanded or when the anode active material layer and the cathode active material layer are expanded due to aging deterioration. As a result, in the all-solid-state secondary battery system of Patent Document 3, even when the battery is not in an overcharge state, the battery is sometimes erroneously judged to be in an overcharge state.

Under these circumstances, the present inventors have found a problem that only by sensing the contact pressure between adjacent layers of stacked batteries, whether or not the stacked battery is in an overcharge state cannot be exactly judged because of expansion of a jig constraining the stacked battery and expansion of the anode active material layer and the cathode active material layer due to aging deterioration.

The present invention has been made to solve the above-described problem, and an object of the present invention is to provide an all-solid-state secondary battery system capable of exactly detecting an overcharge state.

Means to Solve the Problems

The present inventors have made many intensive studies to attain the object above and have accomplished the present invention. The gist thereof is as follows.

<1> An all-solid-state secondary battery system comprising:

a sealed battery having formed by housing, in an outer package, a stacked battery having stacked therein an anode current collector layer, an anode active material layer, a solid electrolyte layer, a cathode active material layer, and a cathode current collector layer, a jig adapted to constrain the sealed battery in the stacking direction, one or more contact pressure sensors provided at least either between an outermost layer surface of the stacked battery and the outer package, or in the inside of the stacked battery, one or more gas pressure sensors provided in a space inside the outer package, and a control device adapted to stop charging by judging as an overcharge state only when the change in contact pressure sensed by at least one of the contact pressure sensors is equal to or more than a threshold value, and the change in gas pressure sensed by at least one of the gas pressure sensors is equal to or more than the threshold value.

<2> The all-solid-state secondary battery system according to item <1>, wherein the stacked battery comprises a plurality of unit battery comprising an anode current collector layer, an anode active material layer, a solid electrolyte layer, a cathode active material layer, and a cathode current collector layer.

<3> The all-solid-state secondary battery system according to item <1> or <2>, wherein the contact pressure sensor is buried in at least any one of the anode current collector layer, the anode active material layer, the solid electrolyte layer, the cathode active material layer, and the cathode current collector layer.

<4> The all-solid-state secondary battery system according to item <1> or <2>, wherein the contact pressure sensor is provided between adjacent layers out of the anode current collector layer, the anode active material layer, the solid electrolyte layer, the cathode active material layer, and the cathode current collector layer.

<5> The all-solid-state secondary battery system according to item <2>, wherein the contact pressure sensor is sandwiched between the unit batteries.

<6> The all-solid-state secondary battery system according to any one of <1> to <5>, comprising two or more sealed batteries, wherein both the contact pressure sensor and the gas pressure sensor are provided in at least one or more sealed batteries, and wherein the control device judges the overcharge stage for every sealed battery.

Effects of the Invention

According to the present invention, an all-solid-state secondary battery system capable of exactly detecting an overcharge state can be provided.

BRIEF DESCRIPTION OF THE DRAWINGS

FIG. 3 A longitudinal cross-sectional view illustrating one example of the stacked battery comprised in the all-solid-state secondary battery system according to the present invention.

MODE FOR CARRYING OUT THE INVENTION

The embodiment of the all-solid-state secondary battery system according to the present invention is described in detail below. The present invention is not limited to the following embodiment.

The all-solid-state secondary battery system of the present invention comprises a sealed battery, a jig, a contact pressure sensor, a gas pressure sensor, and a control device.

Figure 1:
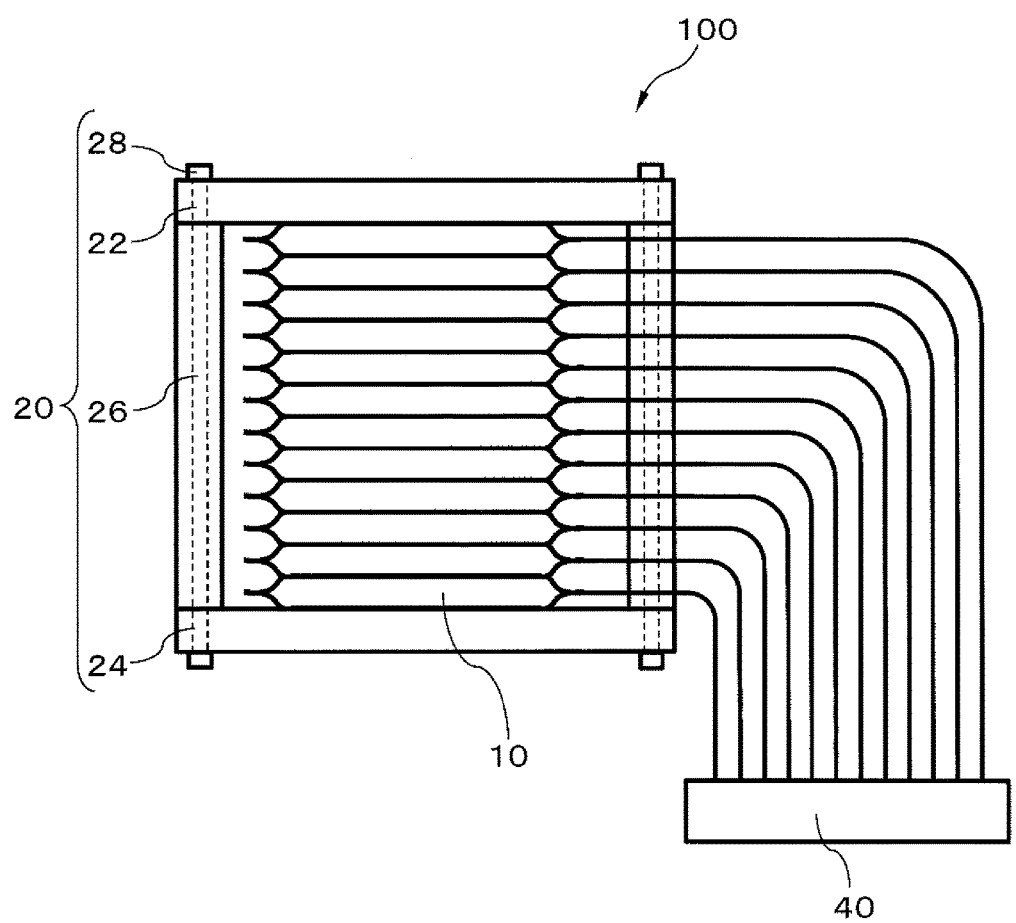
FIG. 1 A schematic view illustrating one example of the embodiment of the all-solid-state secondary battery system according to the present invention.
Figure 2A:
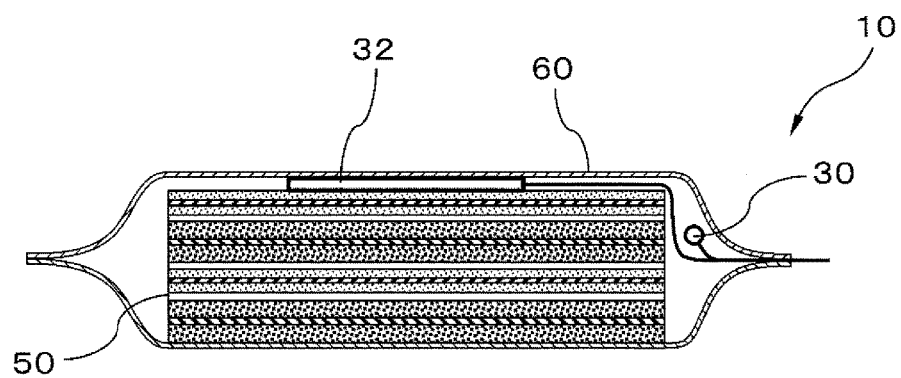
FIG. 2A A longitudinal cross-sectional view illustrating one example of the embodiment of the sealed battery comprised in the all-solid-state secondary battery system according to the present invention.
Figure 2B:
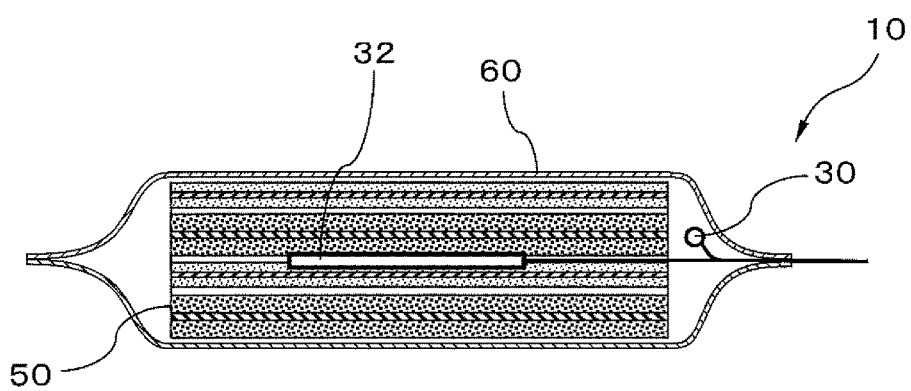
FIG. 2B A longitudinal cross-sectional view illustrating another embodiment of the sealed battery comprised in the all-solid-state secondary battery system according to the present invention.

FIG. 1 is a schematic view illustrating one example of the embodiment of the all-solid-state secondary battery system according to the present invention. FIG. 2A is a longitudinal cross-sectional view illustrating one example of the embodiment of the sealed battery comprised in the all-solid-state secondary battery system according to the present invention. FIG. 2B is a longitudinal cross-sectional view illustrating another embodiment of the sealed battery comprised in the all-solid-state secondary battery system according to the present invention. FIG. 3 is a longitudinal cross-sectional view illustrating one example of the stacked battery comprised in the all-solid-state secondary battery system according to the present invention.

(Sealed Battery)

As illustrated in FIG. 1, the all-solid-state secondary battery system 100 of the present invention has a sealed battery 10. As illustrated in FIGS. 2A and 2B, the sealed battery 10 comprises an outer package 60, and a stacked battery 50 is housed in the inside of the outer package 60.

As for the stacked battery 50, as illustrated in FIG. 3, anode current collector layers 51a, 51b and 51c, anode active material layers 52a, 52b, 52c and 52d, solid electrolyte layers 53a, 53b and 53c, cathode active material layers 54a, 54b, 54c and 54d, and cathode current collector layers 55a, 55b and 55c are stacked.

Respective layers illustrated in FIG. 3 may be each independently stacked, or one anode current collector layer, one anode active material layer, one solid electrolyte layer, one cathode active material layer and one cathode current collector layer may be wound to provide the stacked state illustrated in FIG. 3.

In the case where each layer is independently stacked, respective one-ends of the anode current collector layers 51a, 51b and 51c are bundled into one anode terminal part (not illustrated). The same applies to the cathode current collector layers 55a, 55b and 55c.

In the case where one anode current collector layer, one anode active material layer, one solid electrolyte layer, one cathode active material layer and one cathode current collector layer are wound, one end of one anode active material layer serves as an anode terminal part (not illustrated). The same applies to one cathode current collector layer.

The unit battery 56a comprises, in order, an anode current collector layer 51a, an anode active material layer 52a, a solid electrolyte layer 53a, a cathode active material layer 54a, and a cathode current collector layer 55a. By comprising these layers in this order, the unit battery 56a can be a minimum unit of a power generation element. Similarly, the unit battery 56b comprises, in order, an anode current collector layer 51b, an anode active material layer 52b, a solid electrolyte layer 53b, a cathode active material layer 54b, and a cathode current collector layer 55b. By comprising these layers in this order, the unit battery 56b can be a minimum unit of a power generation element. In addition, similarly, the unit battery 56c comprises, in order, an anode current collector layer 51c, an anode active material layer 52c, a solid electrolyte layer 53c, a cathode active material layer 54c, and a cathode current collector layer 55c. By comprising these layers in this order, the unit battery 56c can be a minimum unit of a power generation element.

In the embodiment illustrated in FIG. 3, the stacked battery 50 comprises three sets of unit batteries 56a, 56b and 56c, but the number of sets is not limited to three sets and may also be a single set (one set).

As illustrated in FIG. 3, the cathode current collector layer 55a of the unit battery 56a and the cathode current collector layer 55b of the unit battery 56b may be shared in common. Similarly, the anode current collector layer 51b of the unit battery 56b and the anode current collector layer 51c of the unit battery 56c may be shared in common. That is, adjacent unit batteries may share the anode current collector layer and the cathode current collector layer in common.

As illustrated in FIG. 3, an anode active material layer 52d and a cathode active material layer 54d may be provided on the outer sides in the stacking direction (in FIG. 3, the outer side in the vertical direction) of the unit batteries 56a, 56b and 56c. Because, the stacked battery 50 is manufactured as follows in many cases.

First, an anode current collector layer (hereinafter, sometimes referred to as "anode layer") having formed on both surfaces thereof an anode active material layer, a solid electrolyte layer, and a cathode current collector layer (hereinafter, sometimes referred to as "cathode layer") having formed on both surfaces thereof a cathode active material layer are prepared. The cathode layer and the anode layer are stacked or wound via the solid electrolyte layer to manufacture a stacked battery.

When an anode current collector layer having formed only one surface thereof an anode active material layer and a cathode current collector layer having formed only on one surface thereof a cathode active material layer are prepared for the outermost layers of a stacked battery, this leads to an increase in man-hours. Accordingly, it is allowed to have, as illustrated in FIG. 3, an anode active material layer 52d and a cathode active material layer 54d on the outer sides in the stacking direction (in FIG. 3, the outer side in the vertical direction) of the unit batteries 56a, 56b and 56c. In this case, the anode active material layer 52d and the cathode active material layer 54d exert no particular function.

Each constituent element of the stacked battery is described below.

(Anode Current Collector Layer)

The material constituting the anode current collector layers 51a, 51b and 51c is not particularly limited as long as the anode current collector layers 51a, 51b and 51c produced from the material function as the anode current collector layers 51a, 51b and 51c of the stacked battery 50. For example, various metals such as Ag, Cu, Au, Al, Ni, Fe, stainless steel and Ti, or an alloy thereof may be used as the material of the current collector material. As the anode current collector layers 51a, 51b and 51c, in view of chemical stability, anode current collector layers 51a, 51b and 51c formed of Cu are preferred, and in view of corrosion resistance, anode current collector layers 51a, 51b and 51c formed of stainless steel are preferred.

(Anode Active Material Layer)

The raw material of the anode active material layers 52a, 52b and 52c contains an anode active material and optionally, an electrical conduction aid, a binder and a solid electrolyte. As long as the anode active material layers 52a, 52b and 52c produced using these raw materials function as the anode active material layers 52a, 52b and 52c of the stacked battery 50, the raw materials above may be selected from the followings. The anode active material layer 52d provided on the outer side in the stacking direction (in FIG. 3, the outer side in the vertical direction) of the unit batteries 56a, 56b and 56c is dealt with in the same way as the anode active material layers 52a, 52b and 52c.

The anode active material is selected from substances capable of storing and releasing a metal ion, for example, lithium ion, and may be selected from a carbon material such as graphite and hard carbon, a silicon material such as Si and Si alloy, and a combination thereof. The anode active material may also be selected from a metal material such as indium, aluminum and tin, and a combination thereof.

The electrical conduction aid may be selected from a carbon material such as VGCF (Vapor Grown Carbon Fiber), acetylene black, Ketjen black and carbon nanotube, and a combination thereof.

The binder may be selected from a polymer resin such as polyvinylidene fluoride (PVDF), butadiene rubber (BR) and styrene butadiene rubber (SBR), and a combination thereof.

With respect to the solid electrolyte as the raw material of the anode active material layers 52a, 52b and 52c, materials recited regarding the solid electrolyte layers 53a, 53b and 53c may be used.

(Solid Electrolyte Layer)

The raw material of the solid electrolyte layers 53a, 53b and 53c contains a solid electrolyte. The raw material of the solid electrolyte layers 53a, 53b and 53c may be selected from the followings, as long as the solid electrolyte layers 53a, 53b and 53c produced using this raw material function as the solid electrolyte layers 53a, 53b and 53c of the stacked battery 50.

The raw material of the solid electrolyte layers 53a, 53b and 53c may be selected from materials usable as a solid electrolyte layer of a lithium ion secondary battery. Specifically, the material of the solid electrolyte layer may be selected from a sulfide-based amorphous solid electrolyte, such as $Li_2S$—$P_2S_5$, $Li_2O.Li_2S.P_2S_5$, $Li_2S$, $P_2S_5$, $Li_2S$—$SiS_2$, $LiI$—$Li_2S$—$SiS_2$, $LiI$—$Li_2S$—$P_2S_5$, $LiI$—$Li_2S$—$P_2O_5$ and $LiI$—$Li_3PO_4$—$P_2S_5$; an oxide-based amorphous solid electrolyte, such as $Li_2O$—$B_2O_3$—$P_2O_5$ and $Li_2O$—$SiO_2$; an oxide-based crystalline solid electrolyte, such as $LiI$, $Li_3N$, $Li_5La_3Ta_2O_{12}$, $Li_7Zr_2O_{12}$, $Li_6BaLa_2Ta_2O_{12}$ and $Li_3PO_{(4-3/2w)}N_w$ (w<1); a sulfide-based crystalline solid electrolyte, for example, a glass ceramic such as $Li_7P_3S_{11}$ and $Li_{3.25}P_{0.75}S_4$, and a thio-LiSiO-based crystal such as $Li_{3.24}P_{0.24}Ge_{0.76}S_4$; and a combination thereof.

(Cathode Active Material Layer)

The raw material of the cathode active material layers 54a, 54b and 54c contains a cathode active material and optionally, an electrical conduction aid, a binder and a solid electrolyte. As long as the cathode active material layers 54a, 54b and 54c produced using these raw materials function as the cathode active material layers 54a, 54b and 54c of the stacked battery 50, the raw materials above may be selected from the followings. The cathode active material layer 54d provided on the outer side in the stacking direction (in FIG. 3, the outer side in the vertical direction) of the unit batteries 56a, 56b and 56c is dealt with in the same way as the cathode active material layers 54a, 54b and 54c.

The cathode active material may be selected from a metal oxide containing lithium and at least one transition metal selected from manganese, cobalt, nickel and titanium, such as lithium cobaltate, lithium nickelate, lithium manganate and lithium nickel-cobalt-manganate; a heteroelement-substituted Li—Mn spinel; lithium titanate; lithium metal phosphate; and a combination thereof.

The cathode active material may be coated with a substance having a lithium ion conduction performance and being capable of maintaining the shape of the coated layer without flowing even when put into contact with an active material or a solid electrolyte. Specifically, the cathode active material may be coated, for example, with $LiNbO_3$, $Li_4Ti_5O_{12}$, or $Li_3PO_4$.

As for the electrical conduction aid and binder of the cathode active material layers 54a, 54b and 54c, materials recited regarding the anode active material layers 52a, 52b and 52c may be used. As for the solid electrolyte as the raw material of the cathode active material layers 54a, 54b and 54c, materials recited regarding the solid electrolyte layers 53a, 53b and 53c may be used.

(Cathode Current Collector Layer)

The material constituting the cathode current collector layers 55a, 55b and 55c is not particularly limited as long as the cathode current collector layers 55a, 55b and 55c produced from the material function as the cathode current collector layers 55a, 55b and 55c of the stacked battery 50, and a current collector layer formed of various metals such as Ag, Cu, Au, Al, Ni, Fe, stainless steel and Ti, or an alloy thereof may be used. In view of chemical stability, the cathode current collector layers 55a, 55b and 55c are preferably a current collector formed of Al.

The outer package 60 in which the stacked battery 50 comprising these constituent elements is described below.

(Outer Package)

The outer package 60 is not particularly limited as long the stacked battery 50 can be housed therein and tightly encapsulated. The outer package includes, for example, an outer package using a thin laminate material obtained by laminating together a metal layer such as aluminum and a heat-welding resin layer via an adhesive layer. Such a laminate material is resistant to an acid and an alkali and has a lightweight, flexible property. The outer package 60 is formed by laying two sheets of the laminate material on top of one another and press-bonding the peripheral edges thereof. The press-bonding method may be a conventional method.

The jig adapted to constrain a sealed battery 10 formed by housing the stacked battery 50 in the outer package 60 is described below.

(Jig)

As illustrated in FIG. 1, the jig 20 constrains the sealed battery 10 in the stacking direction (in FIG. 1, the vertical direction) of respective layers of the stacked battery 50. Hereinafter, with respect to containing the sealed battery 10 by the jig 20, unless otherwise indicated, the containing direction is the stacking direction of respective layers of the stacked battery 50.

In the embodiment illustrated in FIG. 1, twelve sealed batteries 10 are stacked and constrained by the jig 20. The number of sealed batteries 10 stacked is not limited to 12 and may be 1.

In the embodiment illustrated in FIG. 1, the sealed battery 10 is not provided in a direction (in FIG. 1, the horizontal direction) perpendicular to the stacking direction of the stacked battery 50, but the configuration is not limited thereto.

For example, by preparing two sets of assembled batteries each having stacked therein twelve sealed batteries 10 and arranging these two sets in a direction (in FIG. 1, the horizontal direction) perpendicular to the stacking direction of respective layers of the stacked battery 50, twenty-four sealed batteries 10 may be constrained by the jig 20. More specifically, as long as a plurality of sealed batteries 10 are each constrained by the jig 20, the method for arranging a plurality of sealed batteries 10 is not particularly limited.

The sealed battery 10 is constrained by the jig 20, whereby the following effects are obtained, in addition to improved contact between respective layers of the stacked battery 50 and reduction in the internal resistance.

In the case of one sealed battery 10, the stacked battery 50 housed in the sealed battery 10 is fixed not to move inside the outer package 60. In the case of two or more sealed batteries 10, the stacked battery 50 housed in the sealed battery 10 is fixed not to move inside the outer package 60 and in addition, respective stacked batteries 10 are mutually fixed not to collapse the stack of sealed batteries 10. Other than these effects, when the sealed battery 10 is constrained by the jig 20, an effect of functionalizing the contact pressure sensor 32 illustrated in FIGS. 2A and 2B is obtained. More specifically, since the sealed battery 10 is constrained by the jig 20, expansion of the stacked battery 50 can be sensed by the contact pressure sensor 32. This point is described later.

The structure of the jig 20 is not particularly limited as long as the above-described effects can be obtained by constraining the sealed battery 10. For example, as in the embodiment illustrated in FIG. 1, the jig 20 may comprise a first presser bar 22, a second presser bar 24, a pillar 26, and a fastener 28.

The first presser bar 22, second presser bar 24 and pillar 26 comprise a through hole, and the fastener 28 is inserted into the through holes to connect the first presser bar 22, second presser bar 24 and pillar 26. By this connection, the sealed battery 10 is sandwiched between the first presser bar 22 and the second presser bar 24 and constrained.

The first presser bar 22 and the second presser bar 24 are not particularly limited as long as a load can be uniformly imposed throughout the major surface of the sealed battery 10 and the first presser bar 22 and second presser bar 24 are not flexed by the application of load. The first presser bar 22 and second presser bar 24 include a metal bar, etc. The major surface of the sealed battery 10 is a surface perpendicular to the stacking direction of respective layers of the stacked battery 50 in the sealed battery 10.

As for the number of pillars 26, the number of pillars may be appropriately selected in order for the first presser bar 22 and the second presser bar 24 not to flex when the sealed battery 10 is constrained.

The pillar 26 is not particularly limited as long as it is not flexed when the sealed battery 10 is constrained, and includes, for example, a metal bar having a through hole.

The fastener 28 includes a combination of a bolt inserted into through holes of the first presser bar 22, second presser bar 24 and pillar 26 and a nut secured to the bolt.

As another embodiment (not illustrated) of the jig 20, there is a method of using a C-shaped clamp adapted to the fastener 28 of the jig 20. The sealed battery 10 is sandwiched between the first presser bar 22 and the second presser bar 24 and thereafter, the first presser bar 22 is clamped to the second presser bar 24 by the C-shaped clamp. At this time, the C-shaped clamp is tighten such that the sealed battery 10 can be constrained and at the same time, the sealed battery 10 is not broken. When a pillar 26 having a length with which the sealed battery 10 can be constrained and the sealed battery 10 is not broken even by full tightening of the C-shaped clamp, is inserted between the first presser bar 22 and the second presser 24, the clamping force of the C-shaped clamp can be easily controlled.

(Contact Pressure Sensor)

A pressure sensor 32 is provided at least either between an outermost layer surface of the stacked battery 50 and the outer package 60 or in the inside of the stacked battery 50.

FIG. 2A is a longitudinal cross-sectional schematic view illustrating one example of the state where a contact pressure sensor 32 is provided between an outermost layer surface of the stacked battery 50 and the outer package 60. FIG. 2B is a longitudinal cross-sectional schematic view illustrating one example of the state where a contact pressure sensor 32 is provided in the inside of the stacked battery 50.

Sine the sealed battery 10 is constrained by the jig 20, in both cases of FIG. 2A and FIG. 25, the contact pressure sensor 32 can sense the contact pressure. When the stacked battery 50 expands and contracts, the contact pressure sensor 32 senses a change in the contact pressure.

In normal charging/discharging, the anode active material layers 52a, 52b, 52c and 52d, the solid electrolyte layers 53a, 53b and 53c, and the cathode active material layers 54a, 54b, 54c and 54d expand and contract. Accordingly, also in normal charging/discharging, the contact pressure sensor 32 senses a change in the contact pressure.

On the other hand, when (i) the battery enters into an overcharge state, when (ii) the anode active material layers 52a, 52b, 52c and 52d and/or the cathode active material layers 54a, 54b, 54c and 54d are deteriorated with aging, or when (iii) the jig 20 is expanded, the contact pressure sensor 32 senses a significant rise in the contact pressure. The "when the jig 20 is expanded" means that the first presser bar 22 and the second presser bar 24 are expanded in the stacking direction of respective layers of the stacked battery 50 housed inside the sealed battery 10.

The contact sensor 32 is not particularly limited as long as it is a sensor capable of measuring the contact pressure between two things when a sensor is sandwiched between these two things, and includes, for example, a strain gauge-type sensor and a sensor using a piezoelectric element.

The embodiment "in the state where the contact pressure sensor 32 is provided in the inside of the stacked battery 50" is described below. Here, four embodiments are described, but the present invention is not limited thereto. That is, when an embodiment has the same technical idea as these four embodiments, the embodiment having the same idea may be understood to be included within at least one of these four embodiments.

Figure 4A:
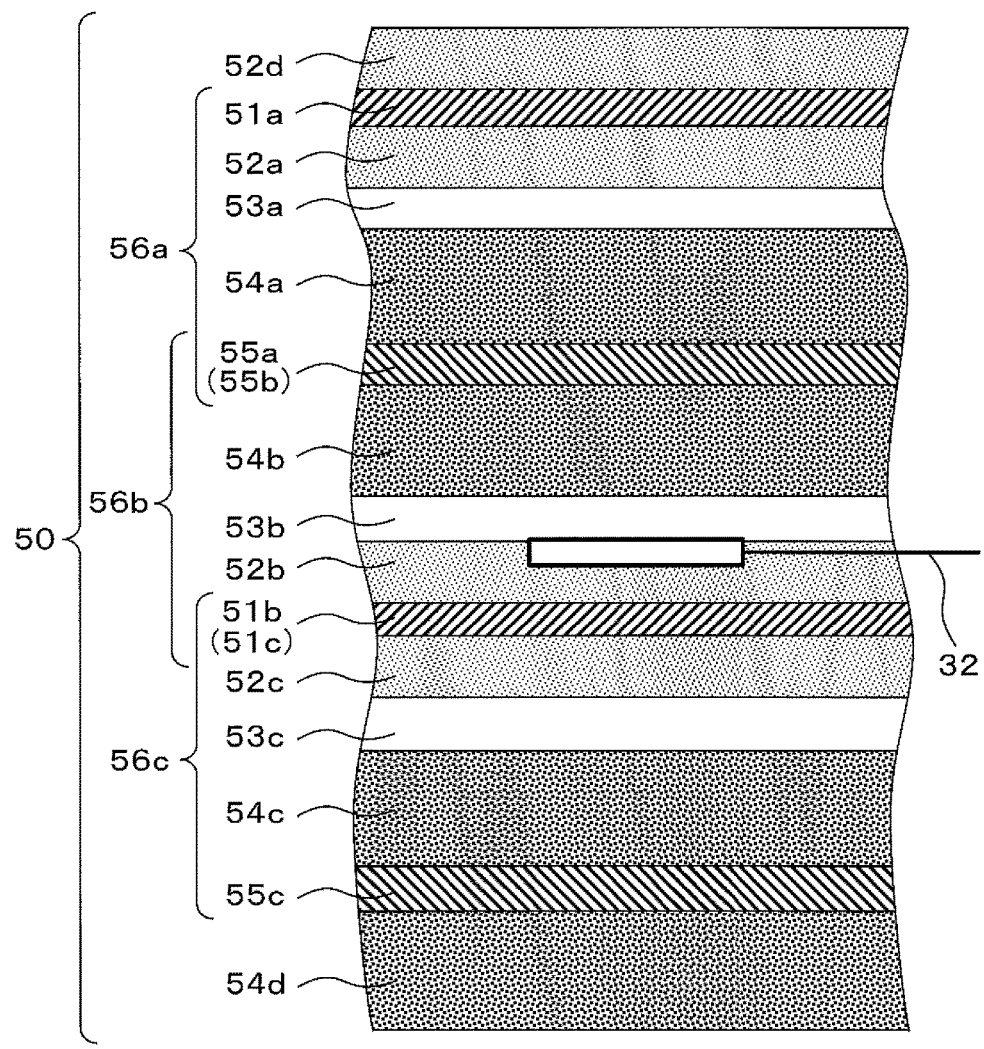
FIG. 4A A longitudinal cross-sectional schematic view illustrating one example of the embodiment where the contact pressure sensor is buried in at least any one of an anode current collector layer, an anode active material layer, a solid electrolyte layer, a cathode active material layer, and a cathode current collector layer.

FIG. 4A is a longitudinal cross-sectional schematic view illustrating one example of the embodiment where the contact pressure sensor 32 is buried in at least any one of anode current collector layers 51a, 51b and 51c, anode active material layers 52a, 52b, 52c and 52d, solid electrolyte layers 53a, 53b and 53c, cathode active material layers 54a, 54b, 54c and 54d, and cathode current collector layers 55a, 55b and 55c.

Figure 4B:
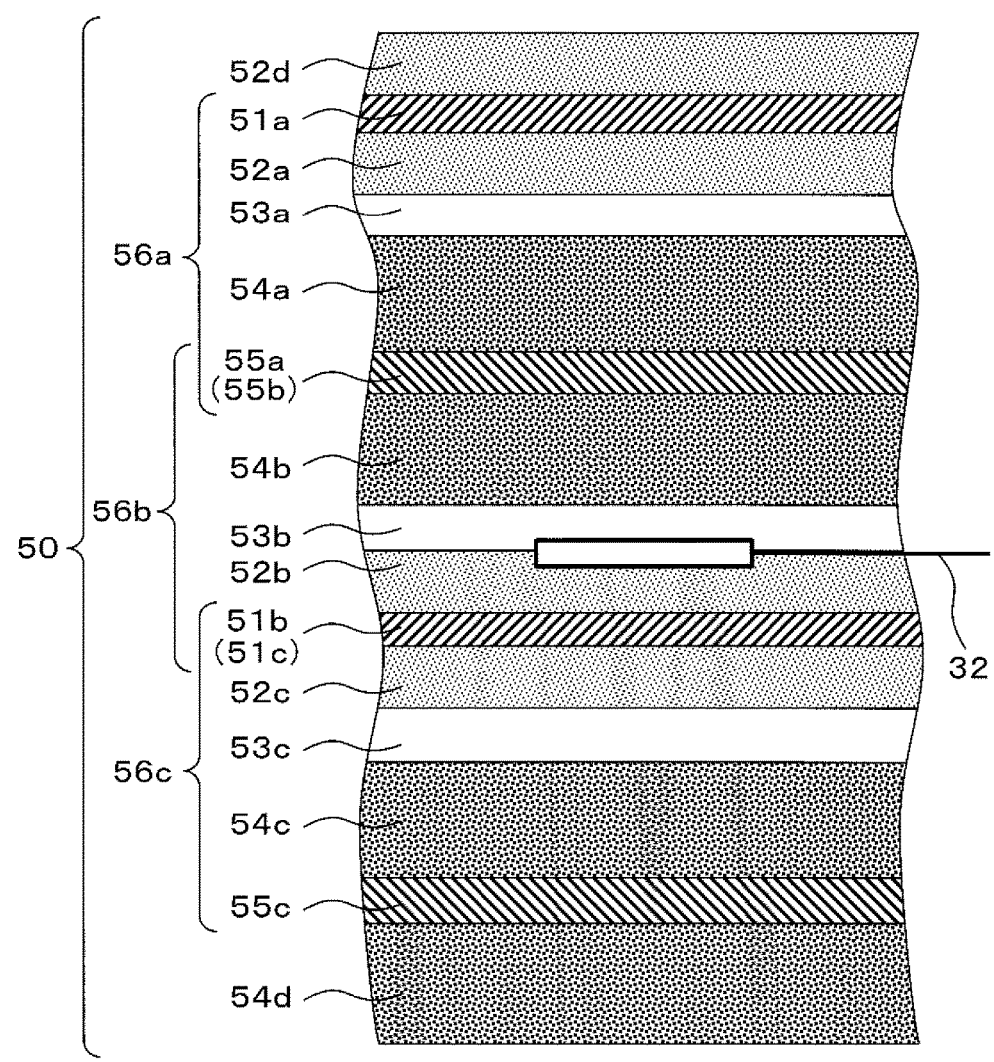
FIG. 4B A longitudinal cross-sectional schematic view illustrating one example of the embodiment where the contact pressure sensor is provided between adjacent layers out of an anode current collector layer, an anode active material layer, a solid electrolyte layer, a cathode active material layer, and a cathode current collector layer.

FIG. 4B is a longitudinal cross-sectional schematic view illustrating one example of the embodiment where the contact pressure sensor 32 is provided between adjacent layers out of anode current collector layers 51a, 51b and 51c, anode active material layers 52a, 52b, 52c and 52d, solid electrolyte layers 53a, 53b and 53c, cathode active material layers 54a, 54b, 54c and 54d, and cathode current collector layers 55a, 55b and 55c.

Figure 4C:
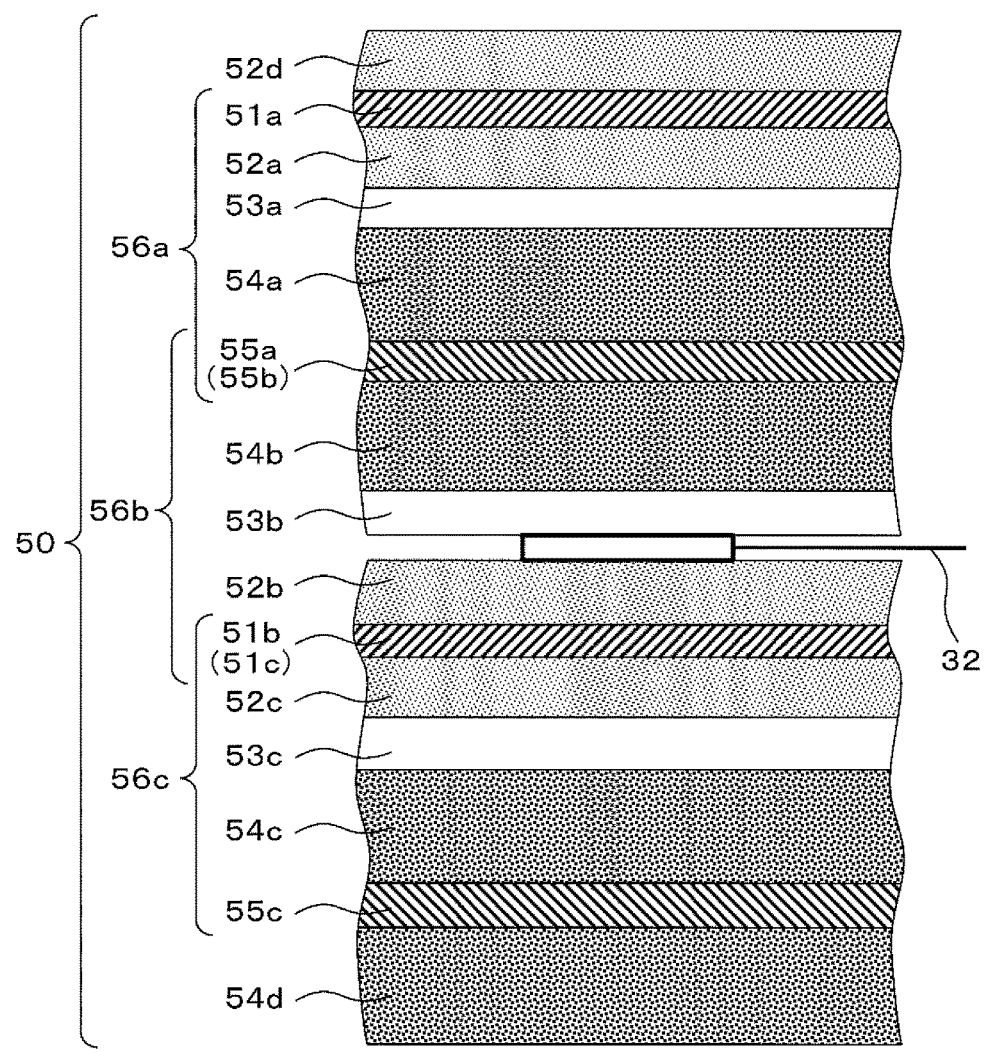
FIG. 4C A longitudinal cross-sectional schematic view illustrating another embodiment where the contact pressure sensor is provided between adjacent layers out of an anode current collector layer, an anode active material layer, a solid electrolyte layer, a cathode active material layer, and a cathode current collector layer.

FIG. 4C is a longitudinal cross-sectional schematic view illustrating another embodiment where the contact pressure sensor 32 is provided between adjacent layers out of anode current collector layers 51a, 51b and 51c, anode active material layers 52a, 52b, 52c and 52d, solid electrolyte layers 53a, 53b and 53c, cathode active material layers 54a, 54b, 54c and 54d, and cathode current collector layers 55a, 55b and 55c.

Figure 4D:
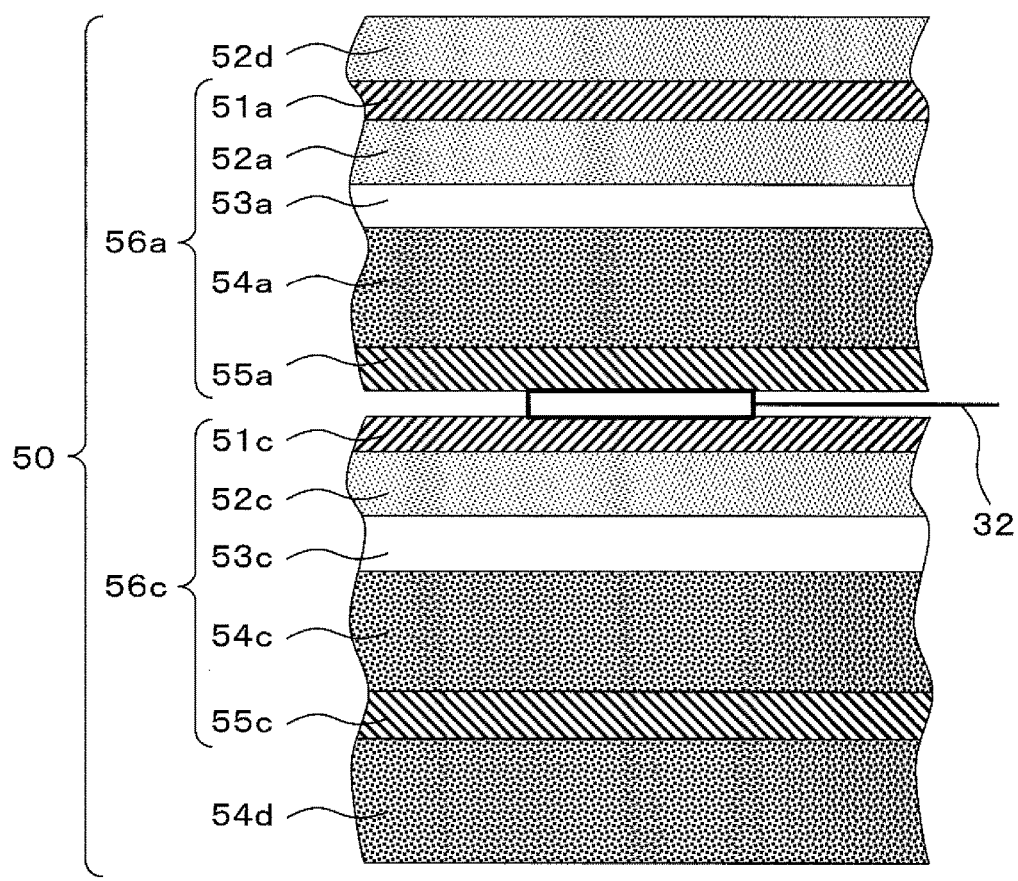
FIG. 4D A longitudinal cross-sectional schematic view illustrating one example of the embodiment where the contact pressure sensor is sandwiched between unit batteries.

FIG. 4D is a longitudinal cross-sectional schematic view illustrating one example of the embodiment where the contact pressure sensor 32 is sandwiched between unit batteries 56a and 56c.

First, the embodiment illustrated in FIG. 4A is described. As illustrated in FIG. 4R, the contact pressure sensor 32 is buried in the anode active material layer 52b. In the embodiment illustrated in FIG. 4A, one surface of the contact pressure sensor 32 is in contact with the solid electrolyte layer 53b, but the present invention is not limited thereto. That is, the entire surface of the contact pressure sensor 32 may be buried in the anode active material layer 52b.

In the embodiment illustrated in FIG. 4A, part of the anode active material layer 52b is not in contact with the solid electrolyte layer 53b, but in a portion where the anode active material layer 52b is in contact with the solid electrolyte layer 53b, lithium ion can pass between these layers.

From the standpoint of reducing the resistance to passing of lithium ion, the area of the major surface (a surface perpendicular to the stacking direction of the stacked battery 50) of the contact pressure sensor 32 is preferably smaller. On the other hand, in view of contact pressure sensing accuracy, the area of the major surface of the contact pressure sensor 32 is preferably larger. In consideration of these viewpoints, a balanced area may be appropriately determined for the area of the major surface of the contact pressure sensor 32.

For preventing a short-circuit, the surface of the contact pressure sensor 32 is preferably coated with an insulating material.

The contact pressure sensor 32 may be buried in a layer other than the anode active material layer 52b. For example, the sensor may be buried in the cathode current collector layer 55a.

The contact pressure sensor 32 may be buried in a plurality of layers. For example, the contact pressure sensor 32 may be buried in each of the solid electrolyte layer 53a, the cathode active material layer 54b, and the anode active material layer 52c. At this time, all contact pressure sensors 32 may be provided at different positions when projected on a plane in a direction perpendicular to the stacking direction of the stacked battery 50. By providing contact pressure sensors 32 in this way, the resistance to passing of lithium ion can be reduced. In addition, even when the contact pressure has a distribution on the plane of projection, the contact pressure can be easily sensed.

A plurality of contact pressure sensors 32 may be buried in the same layer. For example, a plurality of contact pressure sensors 32 may be buried in the anode active material layer 52b. By burying the contact pressure sensors 32 in this way, even when the contact pressure has a distribution in the same layer, the contact pressure can be easily sensed.

The embodiment illustrated in FIG. 4B is described below. As illustrated in FIG. 4B, the contact pressure sensor 32 is provided between the solid electrolyte layer 53b and the anode active material layer 52b. The solid electrolyte layer 53b and the anode active material layer 52b adjoin each other. In the embodiment illustrated in FIG. 4B, the contact pressure sensor 32 is provided across the solid electrolyte layer 53b and the anode active material layer 52b, but the present invention is not limited thereto. For example, in the case where the solid electrolyte layer 53b is thin, the contact pressure sensor 32 may be provided across the cathode active material layer 54b, the solid electrolyte layer 53b, and the anode active material layer 52b.

In the embodiment illustrated in FIG. 4B, the resistance to passing of lithium ion, the area of the major surface of the contact pressure sensor 32, and the coating with an insulating material are the same as in the embodiment illustrated in FIG. 4A.

The contact pressure sensor 32 may be provided between adjacent layers other than between the solid electrolyte layer 53b and the anode active material layer 52b. For example, it may be provided between the cathode active material layer 54a and the cathode current collector layer 55a.

The contact pressure sensor 32 may be provided between each of a plurality of adjacent layer pairs. For example, the contact pressure sensor 32 may be provided between the solid electrolyte layer 53a and the cathode active material layer 54a, between the cathode active material layer 54b and the solid electrolyte layer 53b, and between the anode active material layer 52c and the solid electrolyte layer 53c. At this time, all contact pressure sensors 32 may be provided at different positions when projected on a plane in a direction perpendicular to the stacking direction of the stacked battery 50. By providing contact pressure sensors 32 in this way, the resistance to passing of lithium ion can be reduced. In addition, even when the contact pressure has a distribution on the plane of projection, the contact pressure can be easily sensed.

A plurality of contact pressure sensors 32 may be provided between adjacent layers. For example, a plurality of contact pressure sensors 32 may be provided between the solid electrolyte layer 53b and the anode active material layer 52b. By providing the contact pressure sensors 32 in this way, even when the contact pressure has a distribution on a plane of projection in a direction perpendicular to the stacking direction of the stacked battery 50, the contact pressure can be easily sensed.

The embodiment illustrated in FIG. 4C is described below. As illustrated in FIG. 4C, the contact pressure sensor 32 is provided between the solid electrolyte layer 53b and the anode active material layer 52b. As for the difference from the embodiment illustrated in FIG. 4B, while the contact pressure sensor 32 is provided across the solid electrolyte layer 53b and the anode active material layer 52b in the embodiment illustrated in FIG. 4B, the contact pressure sensor 32 does not straddle the solid electrolyte layer 53b and the anode active material layer 52b in the embodiment illustrated in FIG. 4C.

In the case where the contact pressure sensor 32 is thick, even when the solid electrolyte layer 53b and the anode active material layer 52b are deformed, the solid electrolyte layer 53b and the anode active material layer 52b are not put into contact with each other. Then, lithium ion cannot pass between the solid electrolyte layer 53b and the anode active material layer 52b, Accordingly, in the stacked battery 50, only the unit battery 56a and the unit battery 56c function as a power generation element.

On the other hand, in the case where the contact pressure sensor 32 is thin, the solid electrolyte layer 53b and the anode active material layer 52b are deformed and at a position separate from the contact pressure sensor 32, the solid electrolyte layer 53b and the anode active material layer 52b come into contact with each other. Then, lithium ion can pass between the solid electrolyte layer 53b and the anode active material layer 52b, Accordingly, in the stacked battery 50, the unit battery 56a, the unit battery 56b, and the unit battery 56c function as a power generation element.

That is, in the case where the contact pressure 32 is thin, this becomes the same as the embodiment of FIG. 4B. For this reason, the contact pressure sensor 32 is preferably as thin as possible.

In the embodiment illustrated in FIG. 4O, the area of the major surface of the contact pressure sensor 32 and the coating with an insulating material are the same as in the embodiment illustrated in FIG. 4A, The contact pressure sensor 32 may be provided between adjacent layers other than between the solid electrolyte layer 53b and the anode active material layer 52b. For example, it may be provided between the cathode active material layer 54a and the cathode current collector layer 55a.

The contact pressure sensor 32 may be provided between each of a plurality of adjacent layer pairs. For example, the contact pressure sensor 32 may be provided between the solid electrolyte layer 53a and the cathode active material layer 54a and between the cathode active material layer 54b and the solid electrolyte layer 53b. At this time, all contact pressure sensors 32 may be provided at different positions when projected on a plane in a direction perpendicular to the stacking direction of the stacked battery 50. By providing contact pressure sensors 32 in this way, the resistance to passing of lithium ion can be reduced. In addition, even when the contact pressure has a distribution on the plane of projection, the contact pressure can be easily sensed.

A plurality of contact pressure sensors 32 may be provided between adjacent layers. For example, a plurality of contact pressure sensors 32 may be provided between the solid electrolyte layer 53b and the anode active material layer 52b. By providing the contact pressure sensors 32 in this way, even when the contact pressure has a distribution on a plane of projection in a direction perpendicular to the stacking direction of the stacked battery 50, the contact pressure can be easily sensed.

The embodiment illustrated in FIG. 4D is described below. The embodiment illustrated in FIG. 4D is an embodiment where in the embodiment illustrated in FIG. 4C, the stacked battery 50 is downsized in the stacking direction by omitting the cathode active material layer 54b, the solid electrolyte layer 53b and the anode active material layer 52b, which are not functioning as a power generation element.

As illustrated in FIG. 4D, the unit battery 56a and the unit battery 56c function as a power generation element. That is, in the embodiment illustrated in FIG. 4D, the contact pressure sensor 32 is sandwiched between the unit battery 56a and the unit battery 56c, and short-circuiting of the cathode current collector 55a to the anode current collector 51c is prevented by the contact pressure sensor 32.

As described above, in the case of manufacturing a stacked battery 50, a cathode current collector layer (hereinafter, sometimes referred to as "cathode layer") having formed on both surfaces thereof a cathode active material layer and an anode current collector layer (hereinafter, sometimes referred to as "anode layer") having formed on both surfaces thereof an anode active material layer are previously prepared in many cases. Accordingly, in FIG. 4D, a cathode active material layer may be formed also on the side opposite the cathode active material layer 54a of the cathode current collector layer 55a to complete the cathode layer. Similarly, an anode active material layer may be formed also on the side opposite the anode active material layer 52c of the anode current collector layer 51c to complete the anode layer.

A plurality of contact pressure sensors 32 may be sandwiched between the unit battery 56 a and the unit battery 56c. By sandwiching a plurality of contact pressure sensors 32 between the unit batteries, even when the contact pressure has a distribution on a plane of projection in a direction perpendicular to the stacking direction of the stacked battery 50, the contact pressure can be easily sensed. In addition, since the cathode current collector layer 55a and the anode current collector layer 51c are separated apart by a plurality of contact pressure sensors 32, a short-circuiting between the cathode current collector layer 55a and the anode current collector layer 51c is unfailingly prevented.

The embodiments of FIGS. 4A to 4D described above may also be combined. For example, the embodiment of FIG. 4A may be applied with respect to the cathode active material layer 54b, and the embodiment of FIG. 4B may be applied with respect to the solid electrolyte layer 53b and the anode active material layer 52b. More specifically, while one contact pressure sensor 32 is buried in the cathode active material layer 54a, another contact pressure sensor 32 may be provided across the solid electrolyte layer 53b and the anode active material layer 52b.

(Gas Pressure Sensor)

As illustrated in FIGS. 2A and 2B, a gas pressure sensor 30 is provided in a space inside the outer package 60. The space in which the gas pressure sensor 30 is provided is a space inside the outer package 60 but outside the stacked battery 50.

The all-solid-state secondary battery uses a solid electrolyte instead of a liquid electrolyte. In a battery using a solid electrolyte, a large amount of gas is not produced even when the battery enters into an overcharge state, but a slight amount of water vapor is produced. The water vapor is produced when the battery is overcharged and the solid electrolyte is thereby slightly decomposed. The gas pressure sensor 30 senses a slight change in the gas pressure occurring due to the production of a slight amount of water vapor.

In the all-solid-state secondary battery, even when the battery is not in an overcharge state, a slight amount of water vapor is generated due to heating of the battery. The water vapor is produced when the battery is heated and the solid electrolyte is thereby slightly decomposed. The "battery is heated" as used herein means that the battery is heated at 70 to 150°. The gas pressure sensor 30 senses a slight change in the gas pressure occurring due to the production of a slight amount of water vapor.

That is, the gas pressure sensor 30 senses a slight change in the bas pressure when (i) the battery enters into an overcharge state and when (iv) the battery is heated. Here, (i) and (iv) are serial numbers from the above-described (i) to (iii) when the contact pressure sensor 32 senses a change in the contact pressure.

The gas pressure sensor 30 is not particularly limited as long as it is a sensor capable of measuring a slight change in the gas pressure. The gas pressure sensor includes, for example, gas pressure sensors of a strain gauge type, a semiconductor piezoresistance type, and an electrostatic capacitance type. From the standpoint of sensing a slight change in the gas pressure, a gas pressure sensor of an electrostatic capacitance type is preferred.

A plurality of gas pressure sensors 30 may be provided for one sealed battery. By providing gas pressure sensors 30 in this way, even when the generation of water vapor has a distribution inside the outer package 60, the generation can be easily sensed.

(Contact Pressure Sensor and Gas Pressure Sensor in Case of Comprising Two or More Sealed Batteries)

In the case of comprising two or more sealed batteries 10, both a contact pressure sensor 32 and a gas pressure sensor 30 are provided in at least one sealed battery 10.

In the case where the all-solid-state secondary battery system 100 comprise two or more sealed batteries 10, the time after the start of charging until entering into an overcharge state is sometimes different for every sealed battery 10. In order to unfailingly detect, also in such a case, the fact that the battery is in an overcharge state, both a contact pressure sensor 32 and a gas pressure sensor 30 are preferably provided in all sealed batteries 10.

(Control Device)

The contact pressure sensor 32 and the gas pressure sensor 30 are connected to a control device 40. In the case of comprising a plurality of contact pressure sensors 32, all are connected to the control device 40. The same applies to the gas pressure sensor 30.

Figure 5:
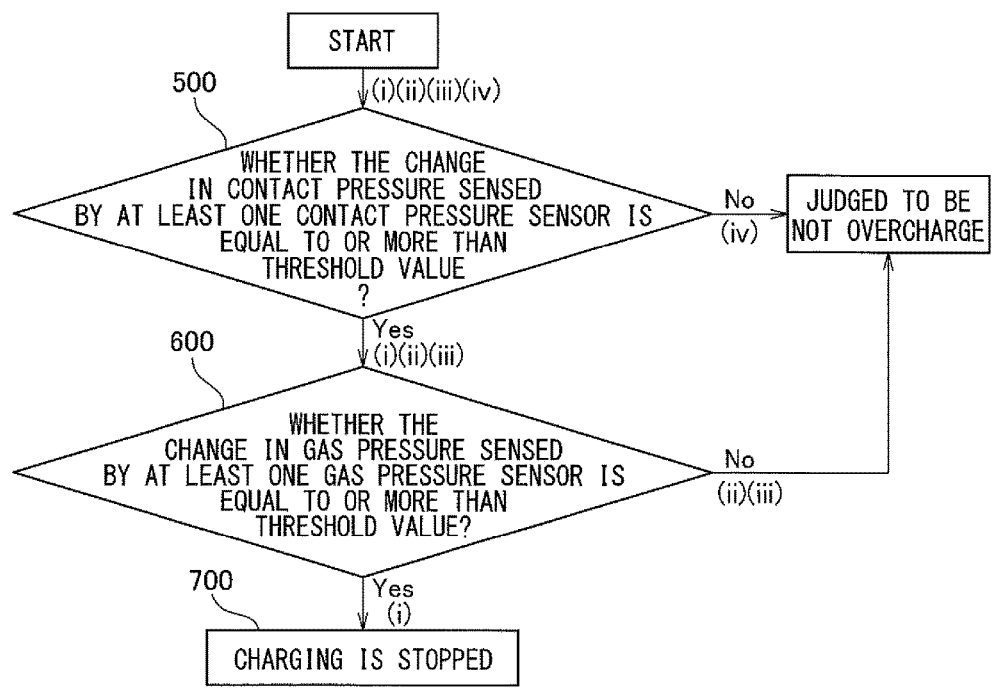
FIG. 5 A flow chart illustrating one example of the charging stopping procedure executed in a control device of the all-solid-state secondary battery system according to the present invention.

Only when the change in contact pressure sensed by at least one of the contact pressure sensors 32 is equal to or more than a threshold value, and the change in gas pressure sensed by at least one of the gas pressure sensors 30 is equal to or more than the threshold value, the control device 40 stops charging of the battery by judging that the battery is in an overcharge state. This is described by referring to the drawing. FIG. 5 is a flow chart illustrating one example of the procedure until the stopping of charging, executed in the control device 40 of the all-solid-state secondary battery system 100 according to the present invention.

Whether the contact pressure sensor 32 and the gas pressure sensor 30 can sense changes in the contact pressure and the gas pressure, respectively, are shown together in Table 1.

TABLE 1

| State of Battery System | Contact Pressure Sensor | Gas Pressure Sensor |
|---|---|---|
| When (i) the battery enters into an overcharge state | sensed | sensed |
| When (ii) the anode active material layer and/or the cathode active material layer are deteriorated with aging | sensed | not sensed |
| When (iii) the jig is expanded | sensed | not sensed |
| When (iv) the battery is heated | not sensed | sensed |

First, the judgment based on a change in the contact pressure sensed by the contact pressure sensor 32 is described. The control device 40 judges whether or not the change in the contact pressure sensed by at least one of the contact pressure sensors 32 is equal to or more than the threshold value.

Since the sealed battery 10 is constrained by the jig 20, the contact pressure sensor 32 senses the contact pressure. The stacked battery 50 expands and contracts by the charging and discharging of the battery, and therefore the contact pressure sensor 32 senses a change in the contact pressure. In normal charging and discharging, the change in the contact pressure is within a given range.

However, when the battery enters into the states (i) to (iii) shown in Table 1, the contact pressure increases significantly beyond the range of change in the contact pressure at normal charging and discharging. Because, when (i) the battery enters into an overcharge state or when (ii) the anode active material layers 52*a*, 52*b*, 52*c* and 52*d* and/or the cathode active material layers 54*a*, 54*b*, 54*c* and 54*d* are deteriorated with aging, the anode active material layers 52*a*, 52*b*, 52*c* and 52*d* and/or the cathode active material layers 54*a*, 54*b*, 54*c* and 54*d* greatly expand more than at normal charging and discharging, and in addition, when (iii) the jig is expanded, the first presser bar 22 and the second presser bar 24 significantly expand in the stacking direction of respective layers of the stacked battery 50 housed inside the sealed battery 10.

On the other hand, when (iv) the battery is heated, the contact pressure may increase beyond the range of change in the contact pressure at normal charging and discharging but is less significantly changed than in the case where the battery enters into the states of (i) to (iii). Because, even when the battery is heated, the anode active material layers 52*a*, 52*b*, 52*c* and 52*d* and/or the cathode active material layers 54*a*, 54*b*, 54*c* and 54*d*, the first presser bar 22, and the second presser bar 24 do not greatly expand as in the states of (i) to (iii).

From these, the following is known. That is, when a threshold value capable of discriminating the change in the contact pressure when the battery enters into the states of (i) to (iii) from the change in the contact pressure when the battery enters into the state of (iv) is decided, the control device 40 can discriminate the states of (i) to (iii) from the state of (iv) based on the change in the contact pressure sensed by the contact pressure sensor 32.

The judgment based on the change in the gas pressure sensed by the gas pressure sensor 30 is described below. The control device 40 judges whether or not the change in the gas pressure sensed by at least one of gas pressure sensors 30 is equal to or more than the threshold value.

When the battery enters into the states of (i) and (iv) shown in Table 1, the gas pressure increases significantly beyond the range of change in the gas pressure at normal charging and discharging. Because, in both when (i) the battery enters into an overcharge state and when (iv) the battery is heated, a slight amount of water vapor is generated from the anode active material layers 52*a*, 52*b*, 52*c* and 52*d* and/or the cathode active material layers 54*a*, 54*b*, 54*c* and 54*d*.

On the other hand, when the battery enters into the states of (ii) and (iii) shown in Table 1, the gas pressure does not increase significantly beyond the change in the gas pressure at normal charging and discharging. Because, even when (ii) the anode active material layers 52*a*, 52*b*, 52*c* and 52*d* and/or the cathode active material layers 54*a*, 54*b*, 54*c* and 54*d* are deteriorated with aging or when (iii) the jig 20 is expanded, a gas such as water vapor is not produced.

From these, the following is known. That is, when a threshold value capable of discriminating the change in the gas pressure when the battery enters into the states of (i) and (iv) from the change in the gas pressure when the battery enters into the states of (ii) and (iii) is decided, the control device 40 can discriminate the states of (i) and (iv) from the states of (ii) and (iii) based on the change in the gas pressure sensed by the gas pressure sensor 30.

As the all-solid-state secondary battery system 100 of the present invention is described hereinabove by using Table 1, when an increase in the pressure is sensed by both the contact pressure sensor 32 and the gas pressure sensor 30, this means that (i) the battery enters into an overcharge state.

The all-solid-state secondary battery system of the present invention is described below by referring to FIG. 5.

First of all, by judging 500 whether the change in the contact pressure sensed by at least one of the contact pressure sensors 32 is equal to or more than the threshold value, the states of (i) to (iv) are sorted into the states of (i) to (iii) and the state of (iv).

Next, by judging 600 whether the change in the gas pressure sensed by at least one of the gas pressure sensors 30 is equal to or more than the threshold value, the states of (i) to (iii) are sorted into the state of (i) and the states of (ii) and (iii).

In this way, the state of (i), i.e., the battery having entered into an overcharge state, is detected, and the charging is stopped 700.

The procedure of FIG. 5 may be reversed.

More specifically, in this embodiment, first of all, by judging 600 whether the change in the gas pressure sensed by at least one of the gas pressure sensors 30 is equal to or more than the threshold value, the states of (i) to (iv) are sorted into the states (i) and (iv) and the states of (ii) and (iii).

Next, by judging 500 whether the change in the contact pressure sensed by at least one of the contact pressure sensors 32 is equal to or more than the threshold value, the states of (i) and (iv) are sorted into the state of (i) and the state of (iv).

In this way, the state of (i), i.e., the battery having entered into an overcharge state, is detected, and the charging is stopped 700.

(Judgment of Overcharge State in Case of Comprising Two or More Sealed Batteries)

In the case of Comprising two or more sealed batteries 10, the judgment whether or not the battery is in an overcharge state is performed for every sealed battery 10. Since, the judgment of the state of the battery system shown in Table 1 is established by providing both a contact pressure sensor 32 and a gas pressure sensor 30 in the same sealed battery 10.

EXAMPLES

The present invention is described more specifically below. However, the present invention is not limited thereto.

An all-solid-state secondary battery system 100 illustrated in FIG. 1 was manufactured, and the state inside the sealed battery 10 was inspected. The anode current collector layers 51a, 51b and 51c, the anode active material layers 52a, 52b, 52c and 52d, the solid electrolyte layers 53a, 53b and 53c, the cathode active material layers 54a, 54b, 54c and 54d, and the cathode current collector layers 55a, 55b and 55c are as follows.

Anode current collector layer: copper
Anode active material layer: a carbon material
Solid electrolyte layer: a sulfide-based solid electrolyte
Cathode active material layer: lithium nickel-cobalt-manganate
Cathode current collector: aluminum The contact pressure sensor 32 and gas pressure sensor 30 used are as follows.

Figure 6:
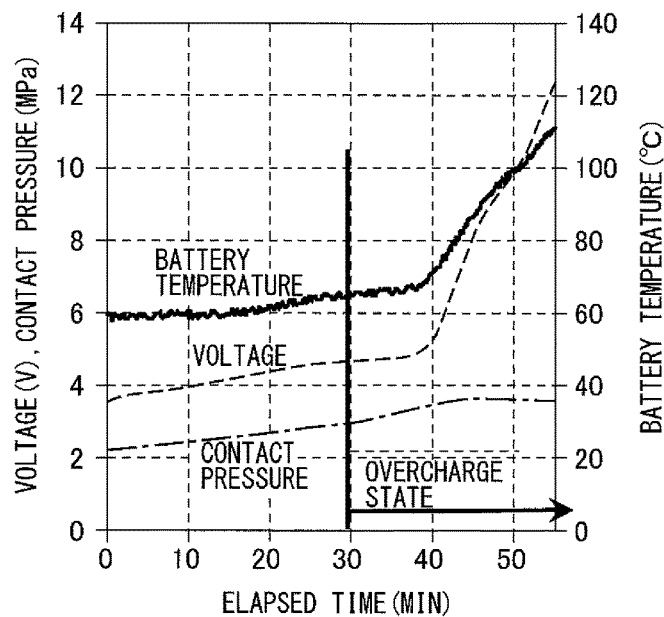
FIG. 6 A graph illustrating the relationship of the elapsed time from the start of charging with the voltage, contact pressure and battery temperature.
Figure 7:
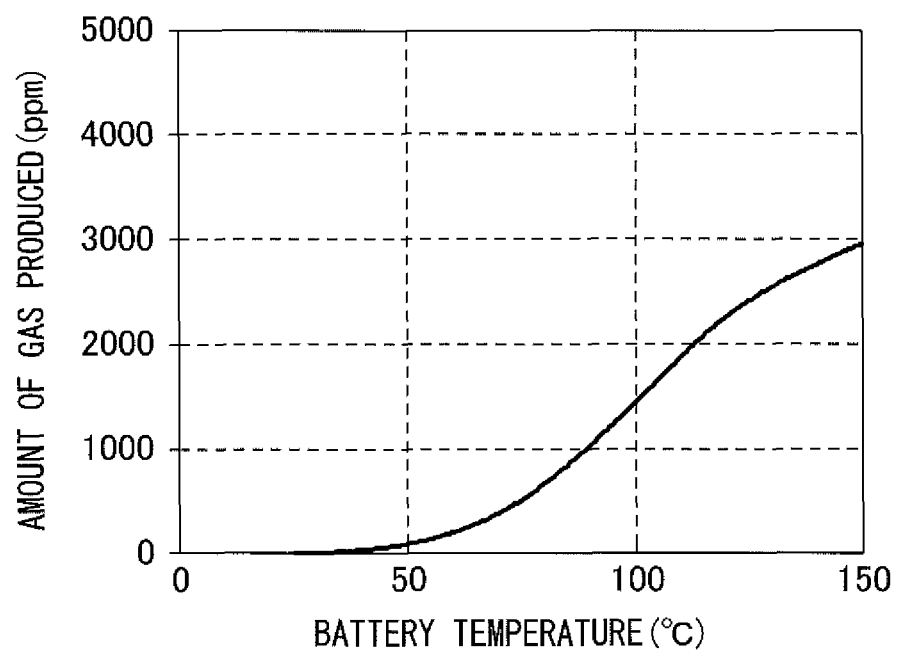
FIG. 7 A graph illustrating the relationship between the battery temperature and the amount of gas produced, when the charging rate is 100%.

Contact pressure sensor: electrostatic capacitance type
Gas pressure sensor: strain gauge type FIG. 6 is a graph illustrating the relationship of the elapsed time from the start of charging with the voltage, contact pressure and battery temperature. FIG. 7 is a graph illustrating the relationship between the battery temperature and the amount of gas produced, when the charging rate is 100%.

As seen from FIG. 6, it was confirmed that when the battery enters into an overcharge state, the change in the contact pressure increases and the battery temperature increases to 70° C. or more. As seen from FIG. 7, it could be confirmed that when the battery temperature exceeds 70° C., a large amount of gas estimated to be water vapor is produced. From these, it was verified that when the change in the contact pressure and the change in the gas pressure are equal to or more than a threshold value, the battery having entered into an overcharge state can be exactly detected.

The effects of the present invention could be confirmed from these results.

DESCRIPTION OF NUMERICAL REFERENCES

10 Sealed battery
20 Jig
22 First presser bar
24 Second presser bar
26 Pillar
28 Fastener
30 Gas pressure sensor
32 Contact pressure sensor
40 Control device
50 Stacked battery
51a, 51b and 51c Anode current collector layer
52a, 52b, 52c and 52d Anode active material layer
53a, 53b and 53c Solid electrolyte layer
54a, 54b, 54c and 54d Cathode active material layer
55a, 55b and 55c Cathode current collector layer
56a, 56b and 56c Unit battery
60 Outer package
100 All-solid-state secondary battery system
500 Threshold judgment of change in contact pressure
600 Threshold judgment of change in gas pressure
700 Stopping of charging

What is claimed is:

1. An all-solid-state secondary battery system comprising:
a sealed battery having formed by housing, in an outer package, a stacked battery having stacked therein an anode current collector layer, an anode active material layer, a solid electrolyte layer, a cathode active material layer, and a cathode current collector layer,
a jig adapted to constrain the sealed battery in the stacking direction,
one or more contact pressure sensors provided at least either between an outermost layer surface of the stacked battery and the outer package, or in the inside of the stacked battery,
one or more gas pressure sensors provided in a space inside the outer package, and
a control device adapted to stop charging by judging as an overcharge state only when the change in contact pressure sensed by at least one of the contact pressure sensors is equal to or more than a threshold value, and the change in gas pressure sensed by at least one of the gas pressure sensors is equal to or more than the threshold value.

2. The all-solid-state secondary battery system according to claim 1, wherein the stacked battery comprises a plurality of unit battery comprising an anode current collector layer, an anode active material layer, a solid electrolyte layer, a cathode active material layer, and a cathode current collector layer.

3. The all-solid-state secondary battery system according to claim 1, wherein the contact pressure sensor is buried in at least any one of the anode current collector layer, the anode active material layer, the solid electrolyte layer, the cathode active material layer, and the cathode current collector layer.

4. The all-solid-state secondary battery system according to claim 1, wherein the contact pressure sensor is provided between adjacent layers out of the anode current collector layer, the anode active material layer, the solid electrolyte layer, the cathode active material layer, and the cathode current collector layer.

5. The all-solid-state secondary battery system according to claim 2, wherein the contact pressure sensor is sandwiched between the unit batteries.

6. The all-solid-state secondary battery system according to any one of claim 1 comprising two or more sealed batteries,
wherein both the contact pressure sensor and the gas pressure sensor are provided in at least one or more sealed batteries, and
wherein the control device judges the overcharge stage for every sealed battery.

* * * * *